Nov. 28, 1939.  J. H. COHEN ET AL  2,181,418
ELECTRIC MOTOR
Filed Oct. 23, 1936  4 Sheets-Sheet 2
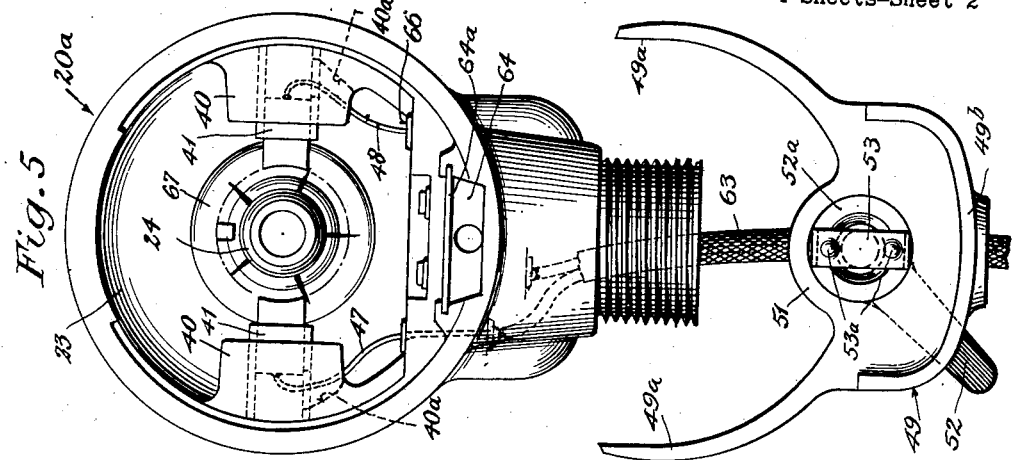
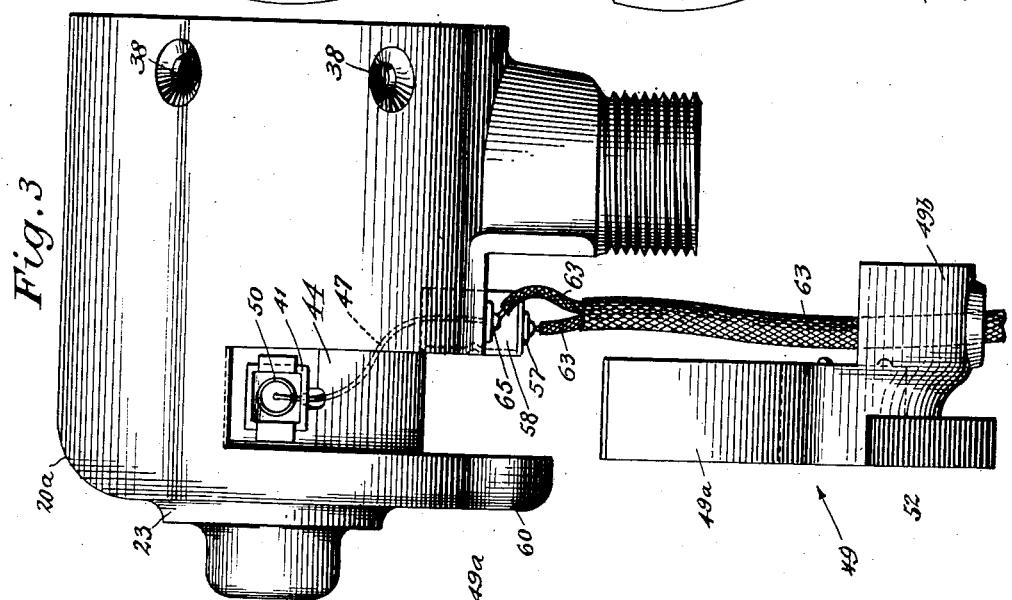
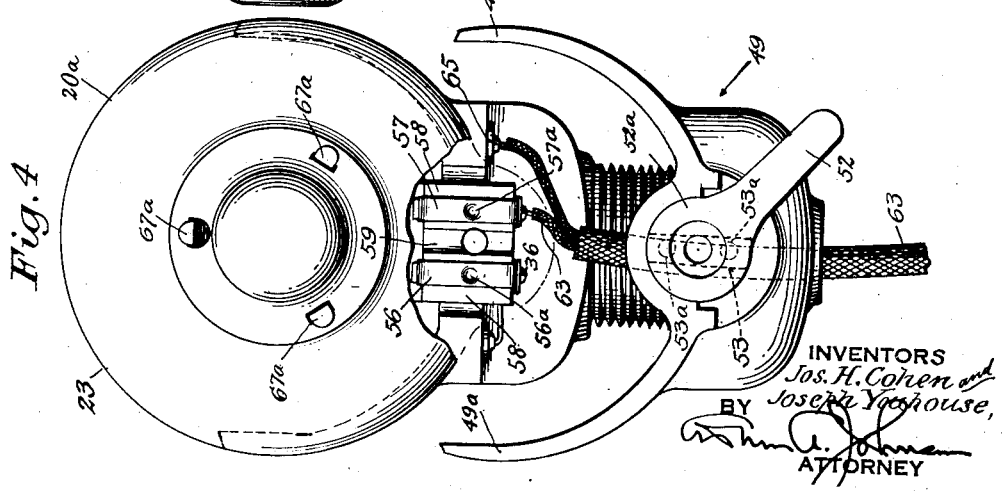
INVENTORS
Jos. H. Cohen and
Joseph Yonhouse,
BY
ATTORNEY Nov. 28, 1939.    J. H. COHEN ET AL    2,181,418
ELECTRIC MOTOR
Filed Oct. 23, 1936    4 Sheets-Sheet 3

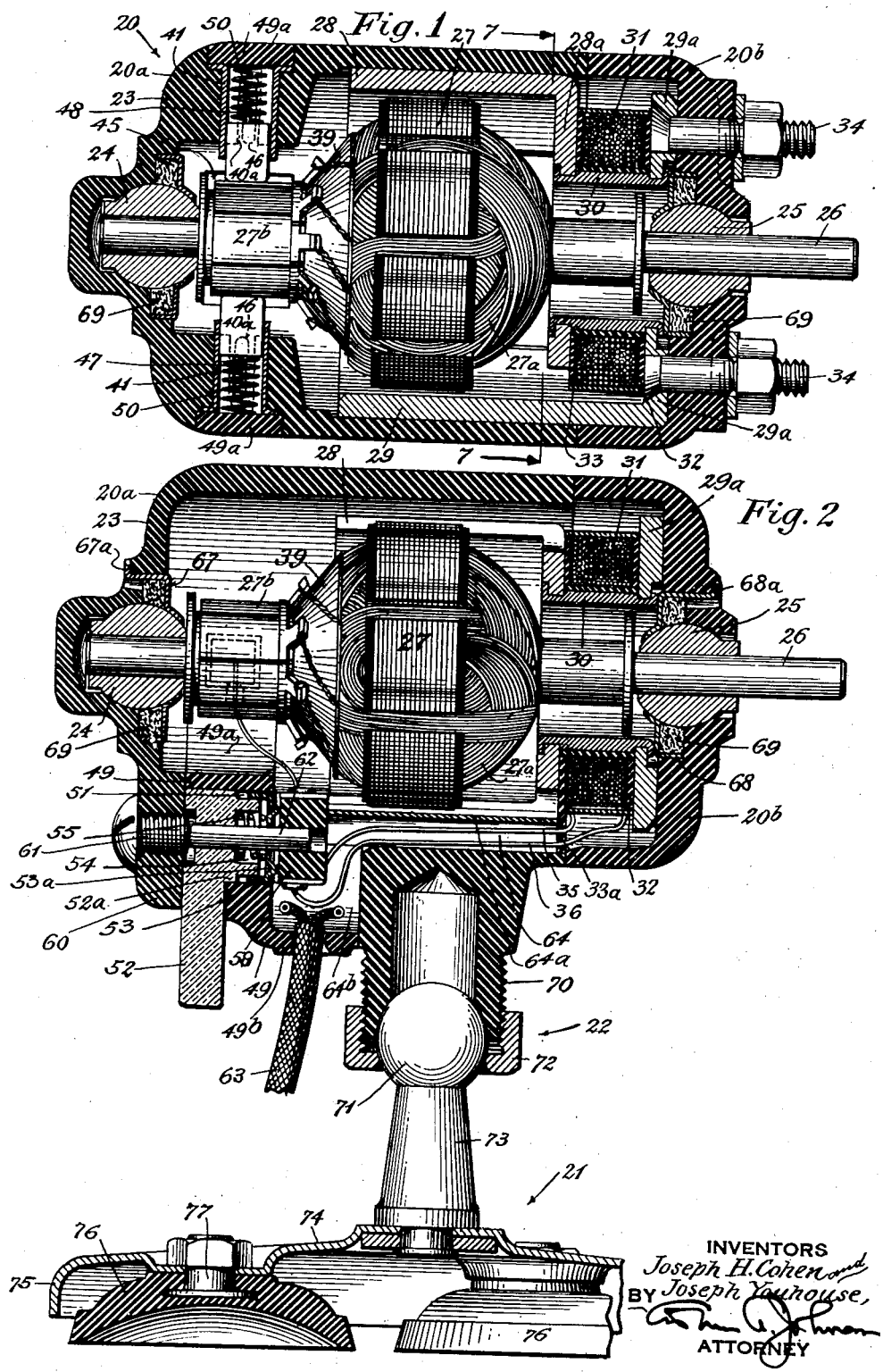

INVENTORS
Joseph H. Cohen, and
Joseph Younhouse,
BY
ATTORNEY

Nov. 28, 1939.    J. H. COHEN ET AL    2,181,418
ELECTRIC MOTOR
Filed Oct. 23, 1936    4 Sheets-Sheet 4
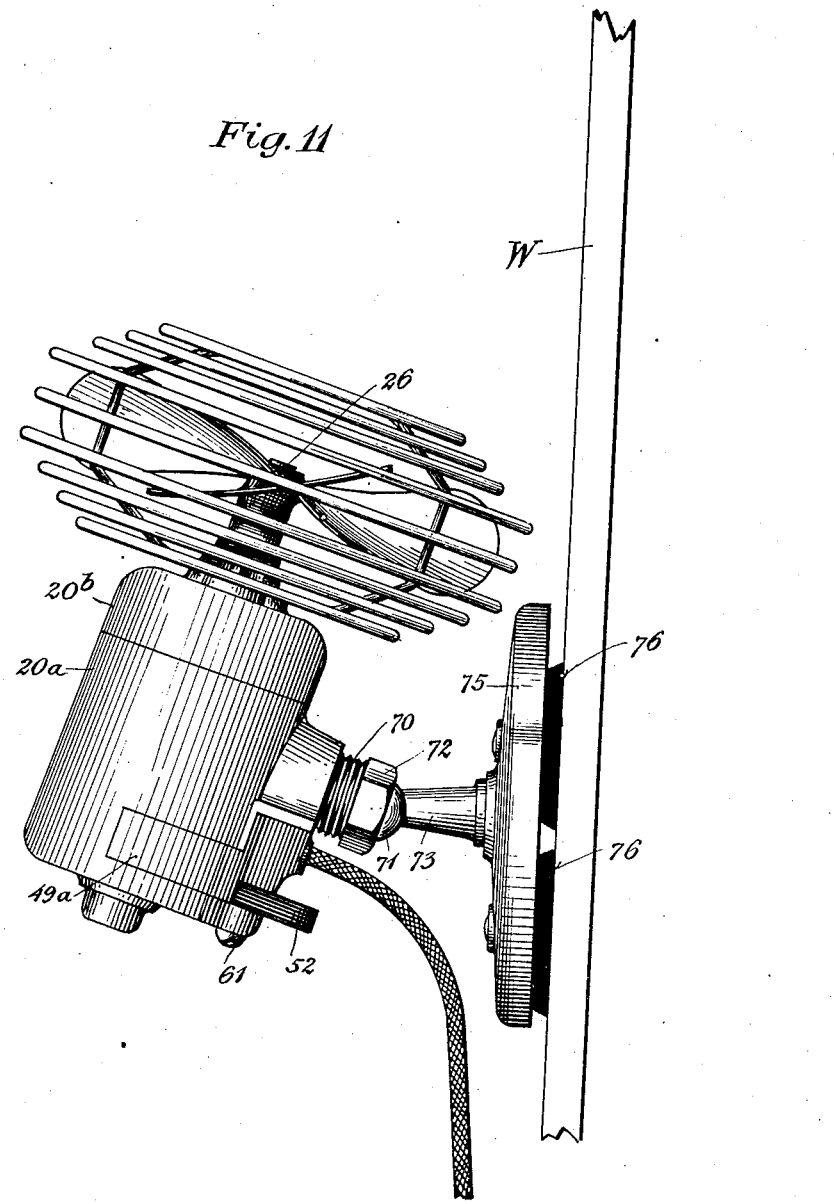
Fig. 11
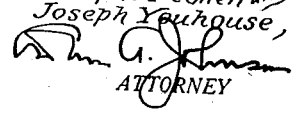

Patented Nov. 28, 1939

2,181,418

UNITED STATES PATENT OFFICE

2,181,418

ELECTRIC MOTOR

Joseph H. Cohen, Bridgeport, and Joseph Youhouse, Fairfield, Conn., assignors to Casco Products Corporation, Bridgeport, Conn., a corporation of Connecticut Application October 23, 1936, Serial No. 107,134

35 Claims. (Cl. 172—36)

This invention relates to electric motors, and more particularly to fan motors.

It is an object of the invention to provide an electric motor which is extremely compact, yet which at the same time possesses the power of motors of larger overall size.

The present invention is shown as applied to a small commutator-type fan motor suitable for six volt direct current use, although the invention is not to be limited to this specific type of motor.

Motors of this standard commutator type consist of a rotatable member or armature having windings connected to a commutator, which latter is engaged by stationary brushes carried by a housing in which is located a salient pole field structure magnetized by a field winding, the poles of the field structure being disposed about the armature of the motor so that the magnetization of said poles, acting with the armature magnetization, produces a torque for turning the armature.

In these prior motors, considering the two-pole field type, the field structure usually comprises a U-shaped iron core having a field winding or coil on the neck or yoke of the core, and the armature of the motor is journaled in bearings mounted on this field structure, so that it rotates between the pole pieces of the field. According to such construction, the yoke of the field structure, carrying the field winding, is disposed laterally of the armature, and thus the largest lateral dimension of the motor, taken through the field coil, is always at least as great as the thickness of the coil plus the diameter of the armature. Although other lateral dimensions of the motor might be as small as the combined diameter of the armature and thickness of the two pole pieces, the larger lateral dimension, taken through the field coil, throws out the proportions of the motor.

This is an extremely important consideration in fan motors, since a large motor casing, or an unsymmetrical casing will partially block off the area supplying air to the fan blades, or will cause undesirable eddy currents, in either case impairing the efficiency of the fan, and requiring a larger input for a given output.

The object of the invention above stated, of providing an extremely compact motor of small size considering its power, is attained in part by obviating this undesirable large lateral motor dimension by providing a novel field structure, in an electric motor, wherein the field yoke and coil are disposed axially of the armature, so that the dimensions of the motor in any direction laterally of the armature are substantially no greater than the combined diameter of the armature plus the thickness of the two pole pieces, and wherein a novel field yoke and coil are provided which do not interfere with extension of the armature shaft beyond the motor casing.

In the embodiment shown, which is at present preferred, the field core has a tubular or cylindrical yoke concentric with the shaft of the armature, the latter passing entirely through the yoke and out of the motor casing, and said yoke carries on its outer cylindrical surface a field coil, disposed between extensions of the pole or shoe pieces of the field, said coil being also concentrically located relatively to the armature shaft. This novel field structure preferably has pole pieces which are cylindrically curved so as to fit closely within the casing and about the armature, and which extend longitudinally of the armature and have apertured lateral extensions connecting with the cylindrical yoke piece. The field coil, carried by the yoke, is thus disposed between the lateral extensions of the pole pieces.

Thus, this improved field structure permits the motor armature to be disposed between the pole pieces in close proximity to the field yoke and coil, these latter extending around and being concentrically disposed relatively to the armature shaft, and being disposed closely adjacent the end of the armature. The field yoke is substantially greater in internal diameter than the armature shaft, so that a substantial air space is provided between said yoke and shaft, thereby reducing magnetic leakage to a minimum. In addition, an adequate magnetic path is provided from one pole piece through the yoke to the other pole piece, and the magnetizing flux resulting from energization of the field coil is substantially wholly carried by the field core structure thus provided. The armature shaft passes centrally through the tubular field yoke, being journaled in a bearing beyond said yoke and extending out through the casing for transmitting power to other devices. According to this construction, the motor casing can now be made to closely conform to the cylindrical shape of the armature, and yet entirely enclose the armature and field.

Additionally, an economy is effected in that a single field coil of simple annular form is all that is necessary to fully and adequately energize the field poles. It should be noted also that this single coil is placed remote from the moving parts, as the armature, and is protected by the structure of the field.

In attaining the object of providing an extremely compact motor, the present invention also provides a novel commutator, brush, and switch organization disposed at the forward end of the motor armature. This organization includes a novel housing means associated with the motor brushes and switch, resulting in an extremely compact structure.

Due to the novel field structure as provided by the invention, the tubular housing or casing of the motor is reinforced inside by large and rigid metal surfaces presented by the pole pieces, which surfaces contact with the inner walls of the casing, and therefore the casing can be molded of a suitable dielectric material, or made up of molded parts. The casing walls are secured to the pole pieces by screws so that there is formed in effect a solid unitary structure of molded walls and metal backing.

This compact and small motor has special utility when employed with a fan to prevent condensation on automobile windshields, since it requires little space and therefore does not obstruct vision, and since it is light in weight and therefore can be secured to the inside surface of the windshield by a suction cup mounting.

Other features and advantages will hereinafter appear.

In the accompanying drawings:

Figure 1 is a horizontal axial sectional view taken through the motor.

Fig. 2 is a vertical axial sectional view.

Fig. 3 is a side elevation of the motor casing with the switch and brush cover shown removed.

Fig. 4 is a left end elevation of Fig. 3.

Fig. 5 is a right end elevation of Fig. 2.

Fig. 11 shows the motor attached to an automobile windshield by the improved mounting, and equipped with a fan and guard.

Figure 7:
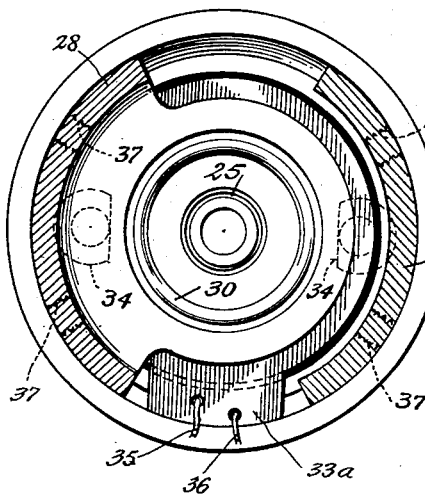
Fig. 7 is a lateral section taken on the line 7—7 of Fig. 1.
Figure 8:
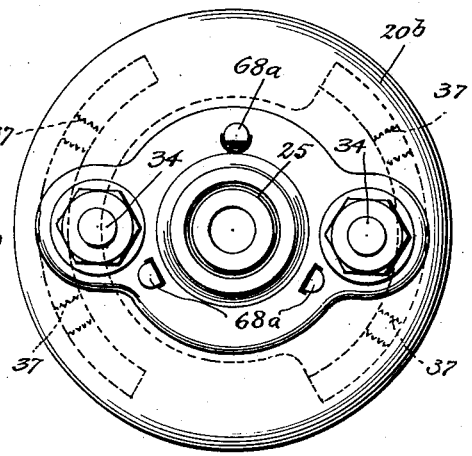
Fig. 8 is a right end elevation of the housing cap as per Fig. 2.

Referring to Figs. 1 and 2, the present invention is shown as applied to a small fan motor. This motor is provided with a substantially tubular housing 20 which is preferably molded of dielectric material, a base or supporting structure 21 having suction cups for adhering to an automobile windshield, and a ball-and-socket connection 22 for mounting the housing on the base. The housing 20 closely encases the armature and field structure of the motor, and also carries improved switching means whereby the motor is turned on and off. As shown, this housing includes a substantially cylindrical body 20a, a circular end or cap 20b, and a bottom closure adapted to fit into the recess of the body 21a, said body, cap, and closure being preferably molded of Bakelite or a similar high quality material.

The body 20a of the casing has relatively thin side walls, and a closed end 23, see Figs. 1, 3, 4 and 5, in which is mounted a ball-shaped bearing block 24 supporting one end of the motor armature shaft.

The cap 20b of the housing is shaped to abut the open end of the body 20a, said cap carrying a similar ball-shaped bearing block 25 in which is journaled the other end of the armature shaft.

The armature of the motor includes the shaft 26 journaled in the bearings 24 and 25, a salient pole laminated core 27 carrying armature windings 27a, and a commutator 27b. The armature is thus rotatably carried by the casing 20, and the diameter of the core 27 of the armature, and of the cylindrical walls of the casing body 20a is such that only a comparatively small pole shoe space exists between these parts. In other words, the internal diameter of the cylindrical walls of the body 20a is larger, by only a comparatively small extent, than the diameter of the armature core 27, and thus the dimensions of the motor taken radially or laterally of the armature are small, resulting in an extremely compact motor.

According to the present invention there is provided a novel and improved field structure energized by only a single annular coil, the poles of which structure require only such small space as that between the armature core and the motor housing, and which poles are adapted to back up and reinforce the relatively thin walls of the casing, and the yoke and coil of which structure are further adapted to occupy economically the space at one end of the armature while at the same time not interfering with the armature shaft and bearing, particularly so that the shaft may extend beyond the bearing and out of the motor casing at the back thereof for purposes of transmitting power.

An embodiment of this improved field structure is shown in Figs. 1, 2, 6 and 7, and comprises a pair of semicylindrical pole pieces or shoes 28 and 29 having large wall-reinforcing surfaces, and being adapted to closely fit about but not touch the armature core 27, said pole shoes having substantially annular extensions 28a and 29a respectively extending laterally thereof and joined to opposite ends of a tubular core member or yoke 30. According to this construction, only a single field coil, as the coil 31, is required, this being disposed between the annular extensions of the pole pieces. The coil 31 is of simple annular shape, and can be quickly wound on a simple form. It will be noted that this coil is located away from the moving armature of the motor, and thus there is positively no danger of injury to the coil in this respect.

Figure 6:
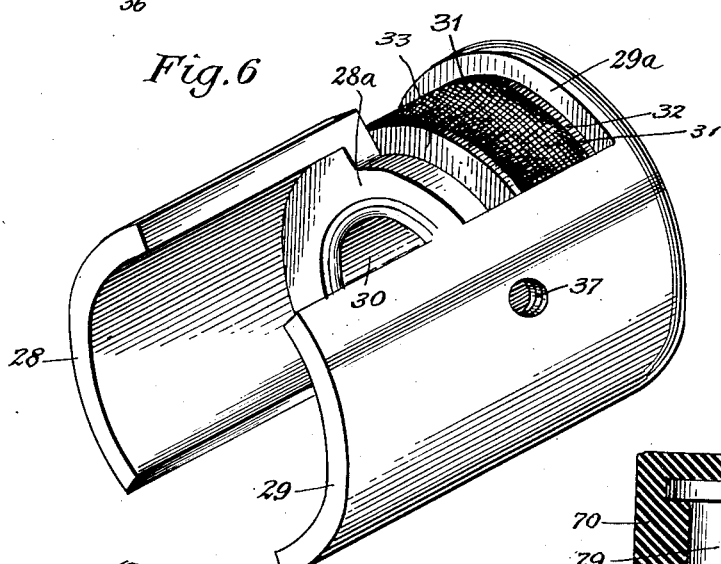
Fig. 6 is a perspective view of the field structure of the motor.

Referring to Fig. 6, it will be seen that the pole piece 28 is shorter than the pole piece 29, preferably to an extent slightly greater than the axial length of the coil 31 so that the latter substantially fills the space between the annular portions 28a and 29a. Preferably each pole piece is relatively large in arcuate dimension, covering an arc of more than 90°, so that a large curved outer surface is presented for contact with the inner walls of the casing to reinforce said walls.

According to the embodiment shown, the tubular core or yoke 30 passes through the annular portions 28a and 29a, having a pair of shoulders, one near each end, for positioning said portions, and the ends of the yoke are spun over or staked over said portions to secure these in place. As shown in Figs. 1 and 2, the coil 31 is carried on an insulating strip wrapped around the outer surface of the core 30, and a pair of insulating washers 32 and 33 are placed on the core over this insulating strip. The coil is preferably wound on a form, however, before being placed on the core 30, and a strip of tape is placed around the outside of the coil to further strengthen and protect it. In assembling the field structure, one end of the core is first passed through and spun over on the annular portion of one of the pole pieces, then the insulating washers and coil are placed on the core, and then the other pole piece is put in place and the other end of the core staked over on the latter.

It will be noted that the insulating washer 33 has an extension 33a at its lower portion having a pair of apertures through which pass lead wires 35 and 36 from the coil 31.

The tubular core 30 preferably has a substantially large bore through which the armature shaft 26 passes, so that there is provided a substantial clearance between said shaft and the core, as shown in Figs. 1 and 2.

The field structure as just described performs important structural functions in addition to its electromagnetic function. The relatively large cylindrically shaped pole pieces 28 and 29 closely fit into the casing body 20a and are secured thereto to reinforce the walls thereof, and the structure as thus secured also serves to hold the cap 20b to said body. The field structure is first attached to the cap 20b by a pair of screws 34 passing through counterbored apertures in the annular portion 29a of the pole piece 29, said screws being prevented from turning by having D-shaped heads closely fitted to said apertures. The screws 34 pass through the cap 20b, see Fig. 1, and are secured by nuts and washers as shown. Then the cap 20b is secured to the body 20a of the motor casing by screwing the pole pieces 28 and 29 to said body, and for this purpose said pole pieces are provided with threaded apertures 37 aligned with countersunk apertures 38 in the casing body 20a. Machine screws are used to hold the pole pieces firmly to the casing walls, and thus not only are the walls reinforced by the large and strong pole pieces, but this organization is used to secure the cap to the casing body.

When the field structure is in place within the casing 20, the pole pieces 28 and 29 will be disposed on opposite sides of the armature core 27, with a small clearance between the pole pieces and the armature.

It will be seen that the present improved field of the motor occupies very little space laterally of the armature, that space which is required being just sufficient for the pole pieces 28 and 29, and the remainder of the field structure occupies economically the space at the end of the armature.

The armature of the motor is wound in the conventional manner and the leads from the armature winding are connected with lugs attached to the commutator bars, as shown. Before connecting these leads to the bars, a split insulating washer 39 of a conical shape is placed over the ends of the armature coils, and the armature leads are carried over this washer and connected with the commutator lugs, said leads thus securely holding the washer in place and the washer at the same time insulating the leads.

Referring to Fig. 5, the body 20a of the motor casing is provided with a pair of inwardly extending diametrically disposed bosses 40, each boss having a substantially square aperture passing axially therethrough. The square apertures in the bosses 40 are adapted to carry brush holders 41, see Fig. 9, which in turn carry brushes 42. These brush holders are box-like in shape, having open ends, and being provided with wings or lugs 43 to position the holders in the bosses.

Figure 9:
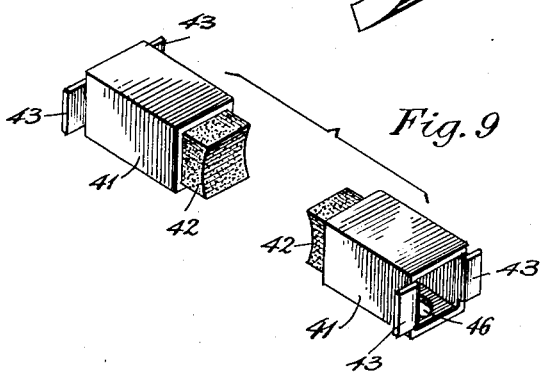
Fig. 9 is a perspective view of the brushes and brush holders.

As shown in Fig. 3, the body 20a of the casing is also provided at each side with a recess or groove 44 extending from the back of the boss 40 downwardly to the bottom of the casing, and the bottom face of each groove, at the lower portion of the casing, is broken through to form a single large square aperture extending upwardly into the interior of the casing, as at 45, see Fig. 1. The brush holders 41 are inserted into the square apertures of the bosses 40 from the outside of the casing so that the wings 43 of said holders engage the bottom faces of the grooves 44 for positioning the holders as afore-mentioned. As seen in Figs. 1 and 9, the holders 41 are provided with slots 46 in their bottom sides to permit wires 47 and 48 from the brushes to pass therethrough, and the bosses 40 of the casing are also slotted for this purpose, as at 40a in Figs. 1 and 5, and thus the brushes are free to move longitudinally in said holders, for engagement with the commutator.

According to the invention there is provided a novel bottom closure or cover 49, Figs. 3, 4 and 5, which has arms 49a adapted to fit into the grooves 44 of the casing to engage the wings 43 of the brush holders 41, thereby securing these in place, said arms also backing-up springs 50 which yieldingly urge the brushes against the commutator 27b.

The arms 49a are united by a yoke which is adapted to carry a switching structure cooperating with contact bars carried by the casing body 20a for the purpose of switching the motor on and off. As seen in Figs. 2, 3, 4 and 5, the yoke of the closure 49 is provided with an aperture 51 which pivotally carries a switch arm 52, said arm having a cylindrical centrally bored barrel 52a journaled in said aperture, the barrel being provided with a diametric slot at its inner face carrying a metal contact-bridging member 53, and having a counterbore 54, see Fig. 2, in which is disposed a compression spring 55 for yieldingly urging the contact-bridging member 53 rearwardly.

The bridging member 53 is substantially U-shaped, the ends being bent to extend into shallow recesses in the barrel 52a so that, should the bridging portion of the member be at any time out of the diametric slot, the ends of said member will still serve to couple it to the barrel by virtue of their engagement in the said recesses thereof.

Adapted to cooperate with the contact-bridging member 53, there is provided a pair of contact bars 56 and 57, see Fig. 4, carried by a ledge 58 on the body 20a of the housing, said bars being substantially parallel and the end of each bar extending over the upper and lower sides of the ledge and being apertured and secured in place by an eyelet passing through the ledge. Intermediate the bars 56 and 57 the face of the ledge is provided with a groove 59 extending parallel with the bars. The contact-bridging member 53 has a pair of raised portions or nibs 53a which are adapted to extend into and contact with depressions 56a and 57a of the bars 56 and 57 respectively when the lever 52 is in closed-circuit position so that the member 53 is disposed across said bars. When the lever 52 is turned to open-circuit position so that the bridging member 53 is parallel with the bars, the nibs 53a will extend into and engage the groove 59. Since the bridging member 53 is spring-urged against the bars and groove, the switch arm will be yieldingly detained in either open or closed circuit position by engagement of the nibs 53a with either said groove or said depressions 56a and 57a of the contact bars.

For the purpose of holding the closure 49 in place, the end portion 23 of the casing is extended downwardly to terminate in a wing 60 which is apertured and threaded to receive a screw 61 having a smooth shank extension 62 extending through the bore of the switch arm 52 and into the ledge 58 of the casing, the bridging member 53 being apertured to admit said shank. Thus, the closure 49 is maintained in position when the screw 61 is screwed into the wing 60, and the smooth shank extension 62 of said screw further serves as a spindle for the switch lever. The cover 49 is provided with a rearwardly extending flange 49b apertured to permit supply wires 63 to pass therethrough into the casing, said flange being adapted to cover over the portion of the casing body 20a which is cut away below the ledge 58.

The lead wires 35 and 36 from the field coil 31 extend forwardly to the switch of the motor through a longitudinal channel 64, see Figs. 2 and 5, in the interior lower portion of the body 21a, the side walls of said channel being slotted to receive an insulating cover plate 64a, which partitions the channel from the casing interior, and eliminates the possibility of the wires coming in contact with the moving armature. The channel 64 extends forwardly to the ledge 58, and said channel opens into a recess 64b, see Fig. 2, in the bottom of the body 20a, and directly behind the ledge. Thus the wires 35 and 36 from the motor field are brought forward to the terminals carried by the ledge 58 without danger of short-circuit or of engagement with the whirling armature.

Connections of the motor are as follows:

One of the lead wires 63 is connected with the contact bar 57, the other of said wires being connected with a connection eyelet 65 carried by the casing, this eyelet in turn being connected with the wire 47 leading to one of the brushes. The wire 48 from the other brush is brought to a connection eyelet 66 which is in turn connected with the wire 35 from the field coil, and the wire 36 from said coil is connected with the contact bar 56. Thus when the switch arm 52 is moved to connect the contact bars 56 and 57, the motor will be series connected to the line, and when the switch is moved to open-circuit position the motor will be disconnected.

The armature shaft 26 of the motor is journaled in the bearing blocks 24 and 25, which are mounted, one in a hub in the end 23 of the casing and the other in a hub in the cap 20b, said bearing blocks being secured in the hubs by plates 67 and 68 in turn secured by fingers 67a and 68a thereof extending through apertures in the casing and bent over at the outside thereof. Each bearing is provided with an oil ring 69 of imbibitory material, oil being supplied through upper apertures of the casing.

For the purpose of supporting the motor and casing on the base 21, the body 20a of said casing is provided at its lower portion with an externally threaded boss 70 having a socket to receive a ball 71 which latter is firmly pressed in the socket and held in adjusted position by a nut 72. The ball 71 is mounted on a stud 73 carried by a circular base plate 74. Referring to Fig. 11, the motor is shown as mounted on the windshield W of an automobile to prevent condensation from forming thereon, and by virtue of its small size and consequent light weight, suction cups can be used for this mounting.

As shown in Fig. 2, the base plate 74 has a down-turned flange 75 at its rim, and at its underside carries a plurality of suction cups 76 each cup having a stud embedded therein, passing through an aperture in the base plate 74, and being secured thereto by a nut, as shown. Thus the motor and fan may be directed, by means of the pivotal mounting, at any portion of the windshield, and may be conveniently placed, and conveniently re-positioned, if desired, by means of the suction cup mounting.

Figure 10:
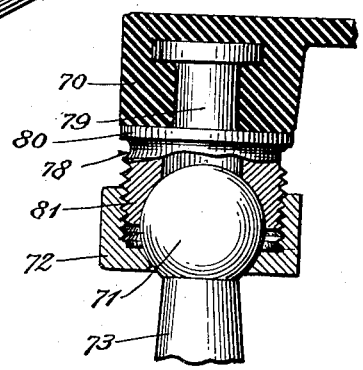
Fig. 10 is a detail in section of a modified form of mounting for the motor casing.

In Fig. 10 is shown a modified mounting for the motor. The boss 70 of the casing has molded therein a metal inset or stud 78 having a headed shank 79, an external collar 80, and an externally threaded socket 81 receiving the ball 71 of the base stud 73, said ball being held in adjusted position by the nut 72.

Variations and modifications may be made within the scope of this invention and portions of the improvements may be used without others.

We claim:

1. In an electric motor, a hollow elongate casing divided intermediate its ends to provide two separable parts, said casing being constructed of moldable dielectric material; a rigid magnetic field structure slidably mounted in the casing and contacting the inner walls of both parts thereof, and reinforcing the same against compressional strains; a field coil carried by said field structure; means for securing said field structure to one part of the casing; means for securing the other part of the casing to the field structure so that said part may be removed therefrom without loosening the structure from the first part; bearings in opposite ends of the casing; an armature having a shaft journaled in said bearings so as to rotate within the field structure; and brushes and holders therefor mounted in one of the parts of said casing and insulated from each other by said part.

2. In an electric motor, a hollow elongate casing having end-walls, said casing being divided intermediate its ends to provide two separable parts, and being constructed of moldable dielectric material; a rigid magnetic field structure slidably mounted in the casing and contacting the inner walls of both parts thereof, and reinforcing the same against compressional strains; means for securing said field structure to one part of the casing, including a pair of bolts passing through said structure and the end-wall of said part; means for securing the other part of the casing to the field structure so that said part may be removed therefrom without loosening the structure from the first part; bearings in opposite ends of the casing; an armature having a shaft journaled in said bearings so as to rotate within the field structure; and a guard adapted to protect a fan secured to the casing by the bolts passing through the field structure.

3. In an electric motor, a hollow elongate casing divided intermediate its ends to provide two separable parts, said casing being constructed of moldable dielectric material; a rigid magnetic field structure slidably mounted in the casing and contacting the inner walls of both parts thereof, and reinforcing the same against compressional strains; a field coil carried by said field structure; means for securing said field structure to one part of the casing; means for securing the other part of the casing to the field structure so that said part may be removed therefrom without loosening the structure from the first part; bearings in opposite ends of the casing; an armature having a shaft journaled in said bearings so as to rotate within the field structure; brushes and holders therefor removably mounted in one of the parts of said casing and insulated from each other by said part; and means constituting a cover plate for the casing, for holding said brushes therein against removal.

4. In an electric motor, a hollow elongate casing divided intermediate its ends to provide two separable parts, said casing being constructed of moldable dielectric material; a rigid magnetic field structure slidably mounted in the casing and contacting the inner walls of both parts thereof, and reinforcing the same against compressional strains; a field coil carried by said field structure; means for securing said field structure to one part of the casing; means for securing the other part of the casing to the field structure so that said part may be removed therefrom without loosening the structure from the first part; bearings in opposite ends of the casing; an armature having a shaft journaled in said bearings so as to rotate within the field structure; brushes and holders therefor removably mounted in one of the parts of said casing and insulated from each other by said part; means constituting a cover plate for the casing, for holding said brushes therein against removal; a pair of contacts carried by the casing, forming the terminals of a gap in the motor circuit; and a movable switch blade carried by said cover plate, for engaging and disengaging said contacts to open and close the gap in the motor circuit.

5. In an electric motor, an armature, and a shaft therefor; a field structure comprising a substantially tubular core through which the armature shaft extends, and from which it is radially spaced; a pole piece connected with one end of the core and extending in a direction parallel to the axis thereof; a second pole piece, located laterally of the first and diametrically opposite thereto having an extension laterally thereof connected with the other end of the core.

6. The invention as defined in claim 5, in which the core has a shoulder engaged by the lateral extension of the pole piece, the end of the core being spun over to engage said extension and secure same on the core.

7. In an electric motor, an armature, and a shaft therefor; a field structure comprising a substantially tubular core through which the armature shaft extends, and from which it is radially spaced, a field coil carried by the core, two diametrically opposite pole pieces, and magnetic conducting means extending radially of the core and coil, connecting opposite ends of the core respectively with said two pole pieces.

8. In an electric motor, a substantially cylindrical casing having a longitudinal channel in the interior wall thereof; an armature rotatably mounted in the casing, said armature having sliding contacts; a pair of brushes carried by the casing and engaging said contacts; a field coil carried by the casing at the end opposite to that housing the contacts and brushes; and electrical connections from the field coil, passing through the channel of the casing, to the brushes.

9. In an electric motor, a substantially cylindrical casing having a longitudinal channel in the interior wall thereof; a connection block carried by the casing at the end of the channel; an armature rotatably mounted in the casing, said armature having sliding contacts; a pair of brushes carried by the casing, engaging said contacts; connections from said brushes to the connection block; a field coil carried by the casing at the end opposite to that housing the contacts and brushes; and electrical connections from the field coil, passing through the channel of the casing, to the connection block.

10. In an electric motor, a casing having a recess therein; a pair of contact bars carried by the casing in the recess thereof and insulated from each other; a switch arm; means, including a cover plate for the casing recess, for pivotally mounting the switch arm on the casing; and a bridging member carried by the switch arm and adapted to engage the contact bars when the arm is in closed-circuit position, and adapted to disengage the contact bars when the switch arm is in open-circuit position.

11. In an electric motor, a casing having a groove therein; a pair of contact bars carried by the casing in the groove thereof, and insulated from each other; a cover for the groove of the casing; a switch arm pivotally mounted on the cover; a bridging member carried by the switch arm and adapted to engage the contact bars when the arm is in closed-circuit position, and adapted to disengage said bars when the arm is in open-circuit position; an apertured boss extending into the casing, the aperture thereof opening into the groove of the casing; a brush carried in the aperture of said boss; and a spring engaging the brush and the cover of the groove for yieldingly urging the brush longitudinally in the boss.

12. The invention as defined in claim 10, in which the casing is of dielectric material and is provided with a grooved portion intermediate the contact bars, in which the contact bars are provided with depressed portions, and in which the bridging member is provided with nibs adapted to engage either the depressed portions of the contact bars or the grooved portion of the casing, for detent purposes.

13. In an electric motor, a substantially cylindrical casing having a longitudinal channel in the interior wall thereof, and having a groove in the exterior wall thereof at one end of the casing; a connection block carried by the casing between one end of the channel and the groove; a pair of contact bars carried by the connection block, and insulated from each other; a cover for the groove of the casing; a switch arm pivotally mounted on the cover; a bridging member carried by the switch arm and adapted to engage the contact bars when the arm is in closed-circuit position, and adapted to disengage said bars when the arm is in open-circuit position; an armature rotatably carried in the casing, said armature having a commutator; a pair of brushes carried by the casing, engaging the commutator, and connected to the connection block; a field coil carried by the casing at the end opposite to that housing the commutator and brushes; and electrical connections from the field coil, passing through the channel of the casing to the connection block.

14. In an electric motor, a substantially tubular casing of moldable dielectric material; a rigid magnetic field structure slidably mounted in the casing, said structure having a pair of cylindrically curved diametrically disposed pole pieces extending longitudinally of the casing, each contacting the inner walls of the casing to reinforce same; means for forcing and holding the contacting walls of the casing against the pole pieces; bearings in opposite ends of the casing; and an armature having a shaft journaled in said bearings so as to rotate within the field structure.

15. In an electric motor, a hollow elongate casing divided intermediate its ends to provide two separable parts, said casing being constructed of moldable dielectric material; a rigid magnetic field structure slidably mounted in the casing and contacting the inner walls of both parts thereof, and reinforcing the same against compressional strains; means for securing said field structure to one part of the casing; means for securing the other part of the casing to the field structure so that said part may be removed therefrom without loosening the structure from the first part; bearings in opposite ends of the casing; and an armature having a shaft journaled in said bearings so as to rotate within the field structure.

16. The invention as defined in claim 8, in which the walls of the channel are grooved, and in which there is an insulating plate held in said grooves to partition the channel from the interior of the casing.

17. In an electric motor, a casing having a recess therein; a pair of contact bars carried by the casing in the recess thereof and insulated from each other; a switch arm; means, including a cover plate for the casing recess, for pivotally mounting the switch arm on the casing; a bridging member carried by the switch arm and adapted to engage the contact bars when the arm is in closed-circuit position, and adapted to disengage the contact bars when the switch arm is in open-circuit position; and means for yieldingly urging the bridging member against the contact bars.

18. The invention as defined in claim 17, in which the contact bars have depressed portions, and in which the bridging member is provided with nibs adapted to engage the depressed portions of the bars for detent purposes.

19. In an electric motor, a casing having a groove therein; a pair of contact bars carried by the casing in the groove thereof, and insulated from each other; a cover for the groove of the casing; a switch arm pivotally mounted on the cover; a bridging member carried by the switch arm and adapted to engage the contact bars when the arm is in closed-circuit position, and adapted to disengage said bars when the arm is in open-circuit position; an apertured boss extending into the casing, the aperture thereof opening into the groove of the casing; a tubular brush holder carried by the boss in the aperture thereof, said holder having a lug extending laterally thereof at the end of the boss to engage the end wall of the boss and the cover of the groove; a brush slidably carried by said holder; and a spring engaging the brush and the cover of the groove for yieldingly urging the brush longitudinally in the holder.

20. In an electric motor, a hollow casing; a field structure within the casing; bearings in opposite ends of the casing; an armature having a shaft journaled in said bearings so as to rotate within the field structure; brushes and holders therefor removably mounted in the casing; means constituting a cover plate for the casing, for holding the brushes therein against removal; a pair of contacts carried by the casing, forming the terminals of a gap in the motor circuit; and a movable switch blade carried by said cover plate for engaging and disengaging said contacts to open and close the gap in the motor circuit.

21. In an electric motor, a hollow elongate casing divided intermediate its ends to provide two separable parts; a rigid magnetic field structure mounted in the casing and contacting the inner walls of both parts thereof, and reinforcing the same against compressional strains; means for securing the field structure to one part of the casing; means for securing the other part of the casing to the field structure so that said part may be removed therefrom without loosening the structure from the first part; bearings in opposite ends of the casing; and an armature having a shaft journaled in said bearings so as to rotate within the field structure.

22. In an electric motor, a hollow elongate casing constructed of moldable dielectric material, said casing having walls at its ends; a rigid magnetic field structure mounted in the casing and reinforcing the same against compressional strains; means for securing said field structure to the casing, including a pair of bolts passing through said structure and through one end wall of the casing; bearings in opposite ends of the casing; an armature having a shaft journaled in said bearings so as to rotate within the field structure; and a guard adapted to protect a fan secured to the casing by the bolts passing through the field structure.

23. In an electric motor, a hollow casing constructed of moldable dielectric material; a rigid magnetic field structure mounted in the casing and reinforcing the same against compressional strains; bearings in opposite ends of the casing; an armature having a shaft journaled in said bearings so as to rotate within the field structure; brushes and holders therefor removably mounted in said casing and insulated from each other by the casing; and a rigid yoke of dielectric material extending partially around the casing and constituting a cover plate on the casing for holding the brushes therein against removal.

24. In an electric motor, a hollow casing constructed of moldable dielectric material, said casing having a semicylindrical recess in its outer surface; a rigid magnetic field structure mounted in the casing and reinforcing the same against compressional strains; bearings in opposite ends of the casing; an armature having a shaft journaled in said bearings so as to rotate within the field structure; brushes and holders therefor removably mounted in channels leading from the recess of said casing and insulated from each other by the casing; and a semicylindrical yoke constituting a cover plate on the casing fitting into the recess thereof for holding the brushes therein against removal.

25. In an electric motor, a hollow casing constructed of moldable dielectric material; a rigid magnetic field structure mounted in the casing and reinforcing the same against compressional strains; bearings in opposite ends of the casing; an armature having a shaft journaled in said bearings so as to rotate within the field structure; brushes and holders therefor removably mounted in the casing and insulated from each other by the casing; means constituting a cover plate on the casing for holding said brushes therein against removal; a pair of contacts carried by the casing, forming the terminals of the gap in the motor circuit; and a movable switch blade carried by said cover plate for engaging and disengaging said contacts to open and close the gap in the motor circuit.

26. In an electric motor, a casing, an armature and a shaft therefor mounted in the casing; a field structure comprising a tubular core through which the shaft extends and from which it is radially spaced; a pole piece connected with one end of the core; a second pole piece having an extension laterally thereof and provided with a hole to slidably receive the other end of the core; a field coil for magnetizing the pole pieces mounted on the tubular core; and means for securing the lateral extension of one of the pole pieces and an end wall of the casing together.

27. In an electric motor, an armature and a shaft therefor; a field coil having an opening through which the shaft extends and from which it is radially spaced; a pair of opposed pole pieces having lateral extensions, the lateral extensions engaging opposite sides of the field coil; and means for securing the lateral extensions together in fixed relation with the field coil to form a unit.

28. In an electric motor, an armature, and a shaft therefor; a field structure comprising a substantially tubular core through which the shaft extends and from which it is radially spaced; a semicylindrical pole piece connected with one end of the core; a second semicylindrical pole piece having an extension laterally thereof provided with a hole to slidably receive the other end of the core; and a field coil for magnetizing the pole pieces and slidably mounted on the core and held thereon by said lateral extension.

29. In an electric motor, an armature and a shaft therefor, a field structure comprising a substantially tubular core through which the shaft extends and from which it is radially spaced; a pole piece having a lateral extension connected to one end of the core; a second pole piece having a lateral extension connected to the other end of the core, the space between the lateral extensions being sufficient to receive and house a field coil; and a field coil disposed on the core between the lateral extensions.

30. In an electric motor, a casing having a longitudinal channel along the interior of the wall; an armature rotatably carried in the casing, said armature having a commutator; a terminal plate of insulating material within the casing adjacent the commutator and the end of the channel; a pair of brushes engaging the commutator and electrically connected to the terminal plate; a field coil carried by the casing at the end opposite to that housing the commutator and brushes; and electrical connections from the field coil, passing through the channel of the casing to the terminal plate.

31. In an electric motor, a casing having a longitudinal channel along the interior of the wall; an armature rotatably carried in the casing, said armature having a commutator; a terminal plate of insulating material within the casing adjacent the commutator and the end of the channel; a pair of brushes engaging the commutator and electrically connected to the terminal plate; a field coil carried by the casing at the end opposite to that housing the commutator and brushes; electrical connections from the field coil, passing through the channel of the casing to the terminal plate; contacts carried by the terminal plate; and a switch arm extending through the casing and having bridging contacts adapted to bridge the contacts on the plate to control a circuit through the motor in accordance with movements of the switch arm.

32. In an electric motor, a casing of moldable dielectric material; a field structure slidably mounted in the casing comprising a tubular core; a pair of cylindrically curved diametrically disposed pole pieces extending longitudinally of the casing and connected to the tubular core, each of the pole pieces engaging and reinforcing the walls of the casing; means for locking the field structure in position in the casing; bearings in opposite ends of the casing; and an armature having a shaft journaled in said bearings and extending through the tubular core in radially spaced relation thereto so as to rotate within the field structure.

33. In an electric motor, a hollow elongate casing divided intermediate its ends to provide two separable parts; a rigid magnetic field structure mounted in the casing and extending along the same to reinforce the walls thereof against compressional strains; means for securing the field structure to one part of the casing; means for securing the other part of the casing to the secured-together field structure and first-named part of the casing so that the second-named part may be removed therefrom without loosening the field structure from said first part; bearings in opposite ends of the casing; and an armature having a shaft journaled in said bearings so as to rotate within the field structure.

34. In an electric motor, a hollow sectional casing constructed of moldable dielectric material; a rigid magnetic field structure mounted in the casing and reinforcing the same; bearings in opposite ends of the casing; an armature having a shaft journaled in said bearings so as to rotate within the field structure; brushes and holders therefor removably mounted in the casing and insulated from each other; a pair of contacts mounted within the casing adjacent the brush holders; and a movable switch arm having a bridging contact thereon and extending through the casing, the section of the casing adjacent the brushes being removable to afford easy access to both the brushes and contacts simultaneously.

35. In an electric motor, an armature and a shaft therefor; a field coil having a substantially tubular opening through which the shaft extends and from which it is radially spaced; and a pair of pole pieces operatively associated with the field coil and extending therefrom in a direction parallel with the shaft and into cooperative relation with said armature.

JOSEPH H. COHEN.
JOSEPH YOUHOUSE.